United States Patent [19]
Perez

[11] Patent Number: 5,918,622
[45] Date of Patent: Jul. 6, 1999

[54] SEPARATION VALVE

[75] Inventor: Reuben Perez, Kibbutz Evron, Israel

[73] Assignee: Bermad, Kibbutz Evron, Israel

[21] Appl. No.: 08/886,692

[22] Filed: Jul. 1, 1997

[51] Int. Cl.[6] ................................................. F16K 31/22
[52] U.S. Cl. .......................................... 137/172; 137/181
[58] Field of Search ...................................... 137/172, 181

[56] References Cited

U.S. PATENT DOCUMENTS

| | | |
|---|---|---|
| 1,995,742 | 3/1935 | Linnmann, Jr. . |
| 2,162,326 | 6/1939 | Cooper . |
| 2,170,247 | 8/1939 | Lambert . |
| 2,259,633 | 10/1941 | Guillaume . |
| 2,551,404 | 5/1951 | Wiggins ............................. 137/172 X |
| 2,673,648 | 3/1954 | Kenney ............................. 137/172 X |
| 2,701,620 | 2/1955 | Crawford ........................... 137/172 X |
| 3,115,888 | 12/1963 | Moyer . |
| 3,385,440 | 5/1968 | Ray . |
| 3,485,370 | 12/1969 | Nozaki et al. . |
| 3,889,706 | 6/1975 | Wallin . |
| 3,957,641 | 5/1976 | Jakubek et al. . |
| 4,051,030 | 9/1977 | Huiet, Jr. . |
| 4,132,238 | 1/1979 | Clark . |
| 4,425,933 | 1/1984 | Fetsch . |
| 4,458,714 | 7/1984 | Delwiche . |
| 4,497,714 | 2/1985 | Harris . |
| 4,528,094 | 7/1985 | Scragg . |
| 4,580,592 | 4/1986 | Clark et al. . |
| 4,632,139 | 12/1986 | Delwichwe . |
| 4,745,942 | 5/1988 | Delwiche . |
| 4,960,513 | 10/1990 | Young . |
| 5,161,564 | 11/1992 | Clark . |
| 5,348,041 | 9/1994 | Clark . |

*Primary Examiner*—Gerald A. Michalsky
*Attorney, Agent, or Firm*—Darby & Darby

[57] ABSTRACT

This invention discloses a separation valve for separating immiscible liquids of different specific gravities, including container having a chamber for receiving the liquids, an outlet at the lower end of the container for outletting the liquid of higher specific gravity, a valve opening between the chamber and the outlet, and a floatable valve member within the chamber movable towards and away from the valve opening, the valve member being of a weight and volume such as to be at least partially immersed in the liquid of lower specific gravity in the chamber and to float in the liquid of higher specific gravity, and thereby to close said valve opening when the liquid of higher specific gravity within the chamber has exited therefrom via the outlet.

10 Claims, 2 Drawing Sheets

SEPARATION VALVE

FIELD OF THE INVENTION

The present invention relates to a separation valve for separating immiscible liquids of different specific gravities. One application for such separation valves is to extract water from a hydrocarbon, but the invention could be advantageously used in many other applications.

SUMMARY OF THE INVENTION

According to the present invention, there is provided a separation valve for separating immiscible liquids of different specific gravities, comprising: a container having a chamber for receiving the liquids; an outlet at the lower end of the container for outletting the liquid of higher specific gravity; a valve opening between the chamber and the outlet; and a floatable valve member within the chamber movable towards and away from the valve opening; the valve member being of a weight and volume such as to be at least partially immersed in the liquid of lower specific gravity in the chamber and to float in the liquid of higher specific gravity, and thereby to close the valve opening when the liquid of higher specific gravity within the chamber has exited therefrom via the outlet.

According to further features in the preferred embodiment of the invention described below, the chamber further includes a vertical guide for guiding the movements of the floatable valve member. The vertical guide is of cylindrical configuration and is formed with a plurality of openings along its length to establish communication between its interior and the chamber. More particularly, the vertical guide includes a plurality of vertically-extending rods arranged in a circular array around the valve opening, and a plurality of rings securing the rods together at vertically spaced points of the rods.

According to further features in the described preferred embodiment, the container has an open upper end which is closed by a cover formed with a circular recess in its inner face centrally thereof for receiving and securing the upper end of the vertical guide. The container further includes a bridge overlying the cover, and a pin threaded through the bridge and engageable with the cover for firmly pressing the cover over the open upper end of the container. In addition, the open upper end of the container is circumscribed by a circular axially-extending flange, and the cover includes a circular seal which is firmly pressed by the pin against the flange.

According to still further features in the described preferred embodiment, the container further includes a conduit having its opposite ends communicating with opposite sides of the valve opening, and a bypass valve in the conduit which may be opened to balance the pressure in the chamber and outlet on opposite sides of the valve opening. The container further includes an air release valve at its upper end for releasing air within the chamber. It further includes an inlet above the valve opening for inletting the two liquids, and a further outlet between the inlet and the valve opening for outletting the liquid of lower specific gravity.

As will be described more particularly below, such a separation valve permits the separation of the heavier liquid from the lighter liquid in an efficient manner.

Further features and advantages of the invention will be apparent from the description below.

BRIEF DESCRIPTION OF THE DRAWINGS

The invention is herein described, by way of example only, with reference to the accompanying drawings, wherein.

DETAILED DESCRIPTION OF A PREFERRED EMBODIMENT

Figure 1:
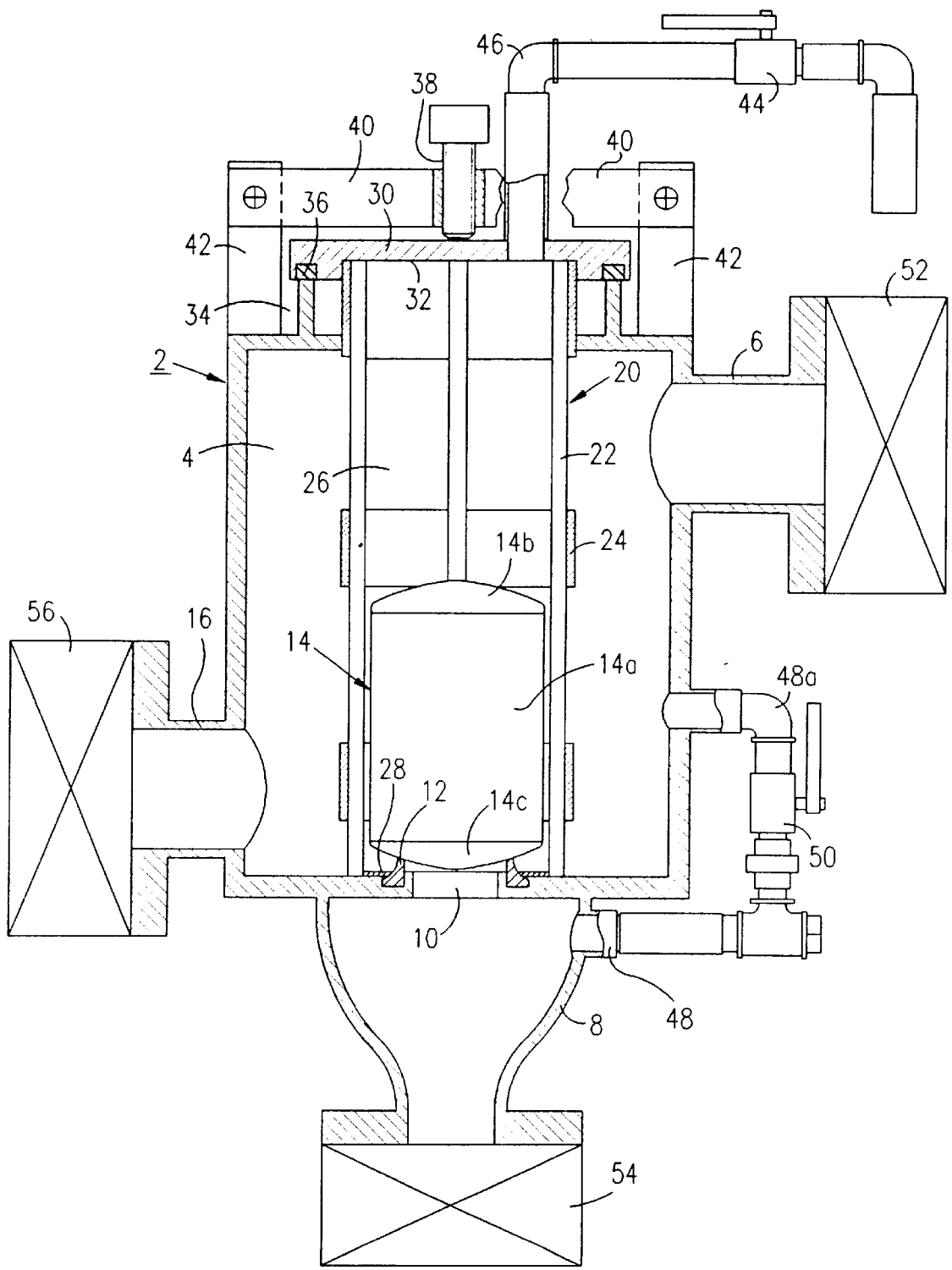
FIG. 1 illustrates one form of separation valve constructed in accordance with the present invention.

The separation valve illustrated in FIG. 1 may be used for separating a heavier liquid, such as water, from a lighter liquid, such as a hydrocarbon. It includes a container 2 having a chamber 4 for receiving the two liquids via an inlet 6. Container 2 further includes an outlet 8 at the lower end of the container for outletting the liquid of higher specific gravity (i.e., the heavier liquid, e.g., water) to separate it from the liquid of lower specific gravity (i.e., the lighter liquid, e.g., a hydrocarbon) which remains in the container.

Container 2 is formed with a valve opening 10 at its lower end between chamber 4 and the outlet 8. Valve opening 10 is circumscribed by valve seat 12 which is engageable by a floatable valve member 14 for closing the valve opening 10.

Floatable valve member 14 is of cylindrical configuration. It includes a cylindrical side wall 14a, a convexly-shaped top wall 14b, and a convexly-shaped bottom wall 14c engageable with valve seat 12 for closing the valve opening 10.

Floatable valve member 14 is of a weight and volume to be at least partially immersed in the liquid of lower specific gravity (e.g., hydrocarbon), and to float in the liquid of higher specific gravity (e.g., water), so as to seat on valve seat 12, and thereby to close the valve opening 10, when the liquid of higher specific gravity within chamber 4 has exited from that chamber via outlet 8, thereby leaving in the chamber only the liquid of lower specific gravity. An outlet 16 is provided in container 2 between the inlet 6 and the valve opening 10 for outletting from chamber 4 the liquid remaining within the chamber after the separation therefrom of the heavier liquid via outlet 8.

The vertical movements of the floatable valve member 14 are guided by a cylindrical guide 20 located within chamber 4. Cylindrical guide 20 is constituted of a plurality of vertically-extending rods 22 arranged in a circular array around valve opening 10 and its valve seat 12, and a plurality of rings 24 securing the rods together at vertically-spaced points of the rods. Such a construction provides openings 26 spaced along the length of the vertical guide to establish communication between the interior of the guide and chamber 4. The lower ends of the rods 22 are secured together by a disc 28 formed with a central opening receiving the valve seat 12.

Container 2 is closed, at its upper open end, by a cover 30 formed on its inner face with a circular recess 32 centrally thereof for receiving and securing the upper end of the cylindrical guide 20 against lateral movement.

The open upper end of container 2 is circumscribed by an axially-extending circular flange 34 which is engageable by a circular seal 36 carried by cover 30. The cover seal 36 is firmly pressed against the end of flange 34 by a pin 38 threaded through a bridge 40 and bearing against the cover. Bridge 40 is fixed by vertical posts 42 to container 2 to overlie the cover 30.

The illustrated separation valve further includes a manually-operated air release valve 44 connected by a conduit 46 to the upper end of cover 30, for releasing air within the container. The separation valve further includes another conduit 48 having one end 48a communicating with chamber 4, and the opposite end 48b communicating with the outlet 8 at the opposite side of valve opening 10. Conduit 48 includes a manually-operated bypass valve 50 for balancing the pressure within chamber 4 and outlet 8 on the opposite sides of valve opening 10.

The illustrated separation valve further includes an inlet valve, schematically indicated at 52, at inlet 6 for inletting into chamber 4 the two (or more) liquids; it also includes outlet valves, schematically indicated at 54 and 56, at its outlets 6 and 16 for outletting the heavier liquid from chamber 4.

The illustrated separation valve may be used in the following manner:

With the air release valve 44, the outlet valve 54 and the bypass valve 50 all closed, the two liquids to be separated are introduced via inlet 6 into chamber 4. The build-up of pressure within chamber 4 tends to close the floating valve member 14, as illustrated in FIG. 1, wherein its end wall 14c engages valve seat 12, to thereby close valve opening 10.

The bypass valve 50 is momentarily opened to equalize the pressure between chamber 4 and the outlet 8 at the opposite side of valve opening 10. This equalizes the pressure on both sides of the floating valve member 14, such that the valve member will now float on the heavier liquid (e.g., water) of the two liquids introduced into chamber 4.

Valves 52 and 56 are now opened. This permits the heavier liquid (e.g., water) within compartment 4 to flow out through opening 10 and outlet 8. When this heavier liquid is replaced by a lighter liquid, the floating valve member 14 floats downwardly towards valve seat 12, such that it engages the valve seat when all, or substantially all, of the heavier liquid has thus been discharged through outlet 8. This terminates the further discharge of the heavier liquid. The lighter liquid remaining within chamber 4 may then be discharged via outlet 16.

Figure 2:
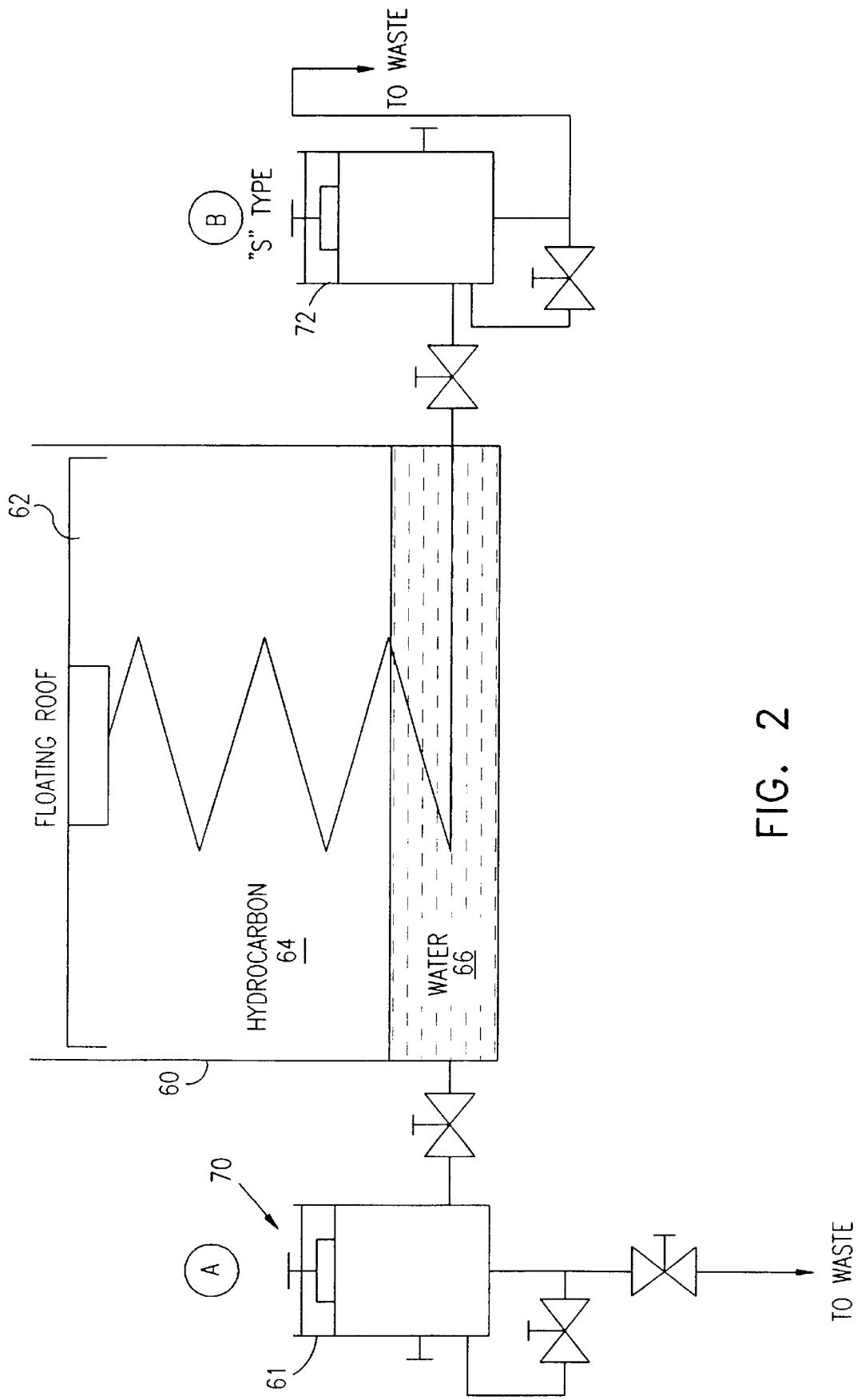
FIG. 2 diagrammatically illustrates one application of the separation valve of FIG. 1.

FIG. 2 illustrates one application of the separation valve of FIG. 1, namely for separating water from a hydrocarbon accumulating within a tank, generally designated 60, having a floating roof 62. Thus, the upper part 64 of the tank is occupied by the lighter hydrocarbon, whereas the lower part 66 of the tank is occupied by water. In this example, the lower part 66 of the tank is connected to two separation valves 70, 72, each of the construction as illustrated in FIG. 1, for separating the water from the hydrocarbon in the lower part 66 of the tank.

It will be appreciated that the separation valve illustrated in FIG. 1 may be used in many other ways. For example, such a separation valve could be connected to the upper part 64 of tank 60, to separate therefrom any water mixed with the hydrocarbon accumulating in the upper part 64 of the tank. It could also be used in a two-phase operation, separating water from the lower part 66 of the tank in one phase, and the water from the upper part 64 of the tank in a second phase. Such a separation valve could also be used for separating other liquids of different specific gravities.

Many other variations, modifications and applications of the invention will be apparent.

I claim:

1. A separation valve for separating immiscible liquids of different specific gravities, comprising:

a container having a chamber for receiving said liquids;

an outlet at the lower end of the container for outletting the liquid of higher specific gravity;

a valve opening between said chamber and said outlet; and a floatable valve member within said chamber movable towards and away from said valve opening, said valve member being of a weight and volume such as to be at least partially immersed in the liquid of lower specific gravity in said chamber and to float in the liquid of higher specific gravity, and thereby to close said valve opening when the liquid of higher specific gravity within said chamber has exited therefrom via said outlet, wherein said chamber includes a vertical guide for guiding the movements of said floatable valve member, wherein said vertical guide is of cylindrical configuration and is formed with a plurality of openings along its length to establish communication between its interior and said chamber, and wherein said container has an open upper end which is closed by a cover formed with a circular recess in its inner face centrally thereof for receiving and securing the upper end of said vertical guide.

2. The separation valve according to claim 1, wherein said vertical guide includes a plurality of vertically-extending rods arranged in a circular array around said valve opening.

3. The separation valve according to claim 2, wherein said vertical guide further includes a plurality of rings securing said rods together at vertically spaced points of said rods.

4. The separation valve according to claim 1, wherein said float is of cylindrical configuration and has an outer diameter slightly less than the inner diameter of said guide.

5. The separation valve according to claim 4, wherein said float includes a side wall of said cylindrical configuration and convexly-curved end walls at its opposite ends.

6. The separation valve according to claim 1, wherein said container further includes a bridge overlying said cover, and a pin threaded through said bridge and engageable with said cover for firmly pressing said cover over the open upper end of the container.

7. The separation valve according to claim 6, wherein said open upper end of the container is circumscribed by a circular axially-extending flange, said cover including a circular seal which is firmly pressed by said pin against said flange.

8. The separation valve according to claim 1, wherein said container further includes a conduit having, its opposite ends communicating with opposite sides of said valve opening, and a bypass valve in said conduit which may be opened to balance the pressure in the chamber and outlet on opposite sides of the valve opening.

9. The separation valve according to claim 1, wherein said container further includes an air release valve at its upper end for releasing air within said chamber.

10. The separation valve according to claim 1, wherein said container includes an inlet above said valve opening for inletting the two liquids, and a further outlet between said inlet and said valve opening for outletting the liquid of lower specific gravity.

* * * * *